United States Patent
Guzik et al.

(10) Patent No.: US 12,513,071 B2
(45) Date of Patent: Dec. 30, 2025

(54) OPERATIONAL STATE MANAGEMENT OF CONNECTED USER DEVICES

(71) Applicants: Getac Technology Corporation, New Taipei (TW); WHP Workflow Solutions, Inc., North Charleston, SC (US)

(72) Inventors: Thomas Guzik, Edina, MN (US); Muhammad Adeel, Edina, MN (US)

(73) Assignees: GETAC TECHNOLOGY CORPORATION, New Taipei (TW); WHP WORKFLOW SOLUTIONS, INC., North Charleston, SC (US)

(*) Notice: Subject to any disclaimer, the term of this patent is extended or adjusted under 35 U.S.C. 154(b) by 0 days.

(21) Appl. No.: 18/075,267

(22) Filed: Dec. 5, 2022

(65) Prior Publication Data
US 2024/0187326 A1 Jun. 6, 2024

(51) Int. Cl.
*H04L 43/10* (2022.01)
*H04W 24/08* (2009.01)
*H04W 76/10* (2018.01)

(52) U.S. Cl.
CPC ............ *H04L 43/10* (2013.01); *H04W 24/08* (2013.01); *H04W 76/10* (2018.02)

(58) Field of Classification Search
CPC ........ H04L 43/10; H04W 24/08; H04W 76/10
See application file for complete search history.

(56) References Cited

U.S. PATENT DOCUMENTS

| | | | |
|---|---|---|---|
| 7,222,166 B2 * | 5/2007 | Treister | H04W 84/20 709/208 |
| 2003/0195019 A1 * | 10/2003 | Litwin | H04M 1/72505 455/574 |
| 2010/0149996 A1 | 6/2010 | Sun | |
| 2014/0157042 A1 | 6/2014 | Johnson et al. | |
| 2016/0294828 A1 * | 10/2016 | Zakaria | H04L 63/0876 |

(Continued)

FOREIGN PATENT DOCUMENTS

| | | | | |
|---|---|---|---|---|
| EP | 1195292 A1 * | 4/2002 | | B60Q 1/115 |
| WO | WO-2022241563 A1 * | 11/2022 | | H04W 4/021 |

OTHER PUBLICATIONS

Xiaoliang Wang et al., 'A Hidden Markov Model Based Dynamic Scheduling Approach for Mobile Cloud Telemonitoring', Fu: 2017 IEEE EMBS International Conference on Biomedical & Health informatics (BHI), 2017.

*Primary Examiner* — Austin J Moreau
(74) *Attorney, Agent, or Firm* — FINNEGAN, HENDERSON, FARABOW, GARRETT & DUNNER L.L.P.

(57) ABSTRACT

Operational states of multiple user devices may be managed based on information that is exchanged by the multiple user devices via heartbeat signals. A user device may receive heartbeat signals from multiple connected devices. A determination is made based at least on the heartbeat signals whether a higher-level hub device with an active network connection to a backend service is connected to the particular user device. Thus, in response to determining that no higher-level hub device with an active network connection to the backend service is connected to the user device, a network connection may be established via a communication channel between the particular user device and the backend service.

20 Claims, 5 Drawing Sheets

(56) References Cited

U.S. PATENT DOCUMENTS

| | | | |
|---|---|---|---|
| 2017/0169640 A1* | 6/2017 | Britt | G06F 21/35 |
| 2018/0279389 A1* | 9/2018 | Kwag | H04L 69/40 |
| 2019/0140908 A1* | 5/2019 | Ma | H04W 48/16 |
| 2019/0174208 A1* | 6/2019 | Speicher | G06F 1/163 |
| 2019/0182068 A1* | 6/2019 | Gould | H04L 12/282 |
| 2020/0154448 A1* | 5/2020 | Wilmunder | H04W 76/10 |
| 2021/0367808 A1 | 11/2021 | Zhan et al. | |
| 2022/0191780 A1* | 6/2022 | Sugata | H04W 48/20 |
| 2022/0210730 A1 | 6/2022 | Peng et al. | |
| 2022/0334992 A1* | 10/2022 | Grubb | G06F 13/385 |
| 2023/0244550 A1* | 8/2023 | Liu | G06F 15/177 |
| | | | 713/1 |

\* cited by examiner

OPERATIONAL STATE MANAGEMENT OF CONNECTED USER DEVICES

BACKGROUND

Law enforcement officers generally carry multiple body-worn electronic devices as they perform their law enforcement functions. For example, law enforcement agencies are increasingly mandating that their police officers carry and use portable recording devices to record their interactions with the public. The recordings may serve to protect the public from improper policing, as well as protect law enforcement officers from false allegations of police misconduct. Other examples of electronic devices that are carried by a law enforcement officer may include a radio, a smartphone, a biometric monitor, a non-lethal electronic shock weapon, and electronic add-on sensors for the officer's primary weapon, i.e., a gun. The add-on sensors may include a sensor that detects the unholster of an officer's gun from its holster or a sensor that detects the firing of the officer's gun. While these electronic devices are designed to aid the officer in performing his or her duties in protecting and serving the public, they are often configured to work independently of one another.

SUMMARY

Described herein are techniques for managing the operational states of multiple connected devices, such as various body-worn devices and in-vehicle devices used by a law enforcement officer, based on information that is exchanged by the multiple connected devices via heartbeat signals. The body-worn devices may include a body camera, a radio, a smartphone, a biometric monitor, a non-lethal electronic shock weapon, electronic add-on sensors for the officer's primary weapon, and/or so forth. In some instances, a body-worn device may be a standalone device that is worn on the body of the law enforcement officer. In other instances, the body-worn device may be integrated into another garment or another piece of equipment already worn by the law enforcement officer, such as a ballistic vest. The in-vehicle devices may include devices that are installed in or on a law enforcement vehicle, such as a laptop, a radio, a camera, a digital video recorder (DVR), and/or so forth. Each of these body-worn and in-vehicle devices may include a built-in battery, power distribution components, data processing components, short-range wireless communication components, physical interface components, and/or so forth. Each set of communication components may include hardware components (e.g., a radio transceiver), software components (e.g., a software stack), or a combination of software and hardware components. The short-range wireless communication components may enable each device to exchange communications with other devices via short-range wireless communication, such as Bluetooth, ultra-wide band (UWB), or Wi-Fi. The physical interface components may enable each device to exchange wired communications with other devices via one or more corresponding electrically conductive wired connections. For example, each of the body-worn devices may be equipped with electrically conductive coupling ports. In this way, an electrically conductive wired connection may be made between the body-worn devices using one or more electrical wires or cables that can be removably plugged into the electrically conductive coupling ports. The electrically conductive wired connections may enable each device to exchange communications with one or more other physically connected devices without the use of wireless communication.

At least some of the body-worn devices or in-vehicle devices may be further equipped with long-range wireless communication components. Such long-range wireless communication components may enable a device to exchange communications with a computing device at a network operations center (NOC) via long-range wireless communication, such as cellular or satellite communication. However, in some instances, a device may also use its short-range communication components to obtain access to a network that enables the device to exchange communication with the computing device at the NOC. For example, a device may use its built-in Wi-Fi communication components to connect to an available Wi-Fi access point, and then use the Internet access provided by the access point to communicate with the computing device at the NOC. In some instances, a particular device that is able to establish a communication connection with the computing device at the NOC may then act as a gateway device, i.e., a hub device, that is able to route communications between the other devices connected to the particular device and the computing device at the NOC. For example, the particular device may be a smartphone that is carried by a law enforcement officer and the connected device may be a body camera of the law enforcement officer. Thus, as the body camera is activated and records a multimedia stream, the body camera may transmit the multimedia stream to the smartphone via short-range wireless or wired communication. In turn, the smartphone may use long-range wireless communication (e.g., cellular communication) to transmit the multimedia stream to the computing device at the NOC. In turn, the computing device at the NOC may execute a backend service that archives the multimedia stream in a data store, analyzes the multimedia stream to determine whether one or more actions are to be initiated, and/or performs other tasks based on received data.

In various embodiments, each of the multiple devices that are connected together, i.e., communicatively coupled together, may send heartbeat signals to every other connected device. Each of the heartbeat signals may include data such as device identification information, device type information, current battery level, current activity status, current network connectivity status, and/or so forth. Thus, a connected device of the multiple connected devices may determine based on the heartbeat signals whether a higher-level hub device with an active network connection to a backend service of a NOC is available, i.e., communicatively connected to the connected device. Accordingly, if the higher-level hub device is available, the connected device may send any sensor data that the connected device detects to the higher-level hub device for analysis and/or further transmission to the backend service of the NOC. However, if the higher-level hub device is not available, the connected device may attempt to initiate an active network connection via a communication channel to the backend service of the NOC. Subsequently, if the connected device is able to successfully establish an active network connection to the backend service, the connected device may then act as a hub device for routing communications between one or more other devices that are connected to the connected device and the backend service. For example, the connected device may send out heartbeat signals that indicate that the connected device is functioning as a hub device, such that the other devices may use the connected device for communication to the backend service. In some instances, by acting as the hub device, the connected device may also analyze the data that are received from the one or more devices to determine whether at least one device is to be triggered to take one or more actions based on the data.

In some embodiments, each of the connected devices may be capable of switching between different operational states based on its battery level while sending out heartbeat signals to other connected devices. For example, a connected device may switch from an active state to a lower power energy-saving state to conserve its battery when the battery level of the connected device drops below a predetermined battery level threshold. (e.g., 10% battery life remaining). However, such switching by the connected device may be overridden by a hub device or a backend service of NOC based on data provided by the connected device or another connected device. For example, a body camera may switch from an active multimedia streaming state to a low power sleep state when the battery level of the body camera is below a 10% battery level. However, when the hub device receives data that indicates a gun sensor has detected that a gun is unholstered, the hub device may switch the body camera back to the active multimedia streaming state despite the critically low battery level. In another example, an in-vehicle camera in a particular vehicle may switch from an active multimedia streaming state to a low-power sleep state when the battery level of the in-vehicle camera is below a 4% battery level and the particular vehicle's engine is powered off. However, when the backend service at the NOC receives information from the smartphone of another law enforcement officer that the other law enforcement officer is responding to an incident that is within a predetermined distance of the location of the particular vehicle, the backend service may send a command that directs the in-vehicle camera to switch back to the active multimedia streaming state.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
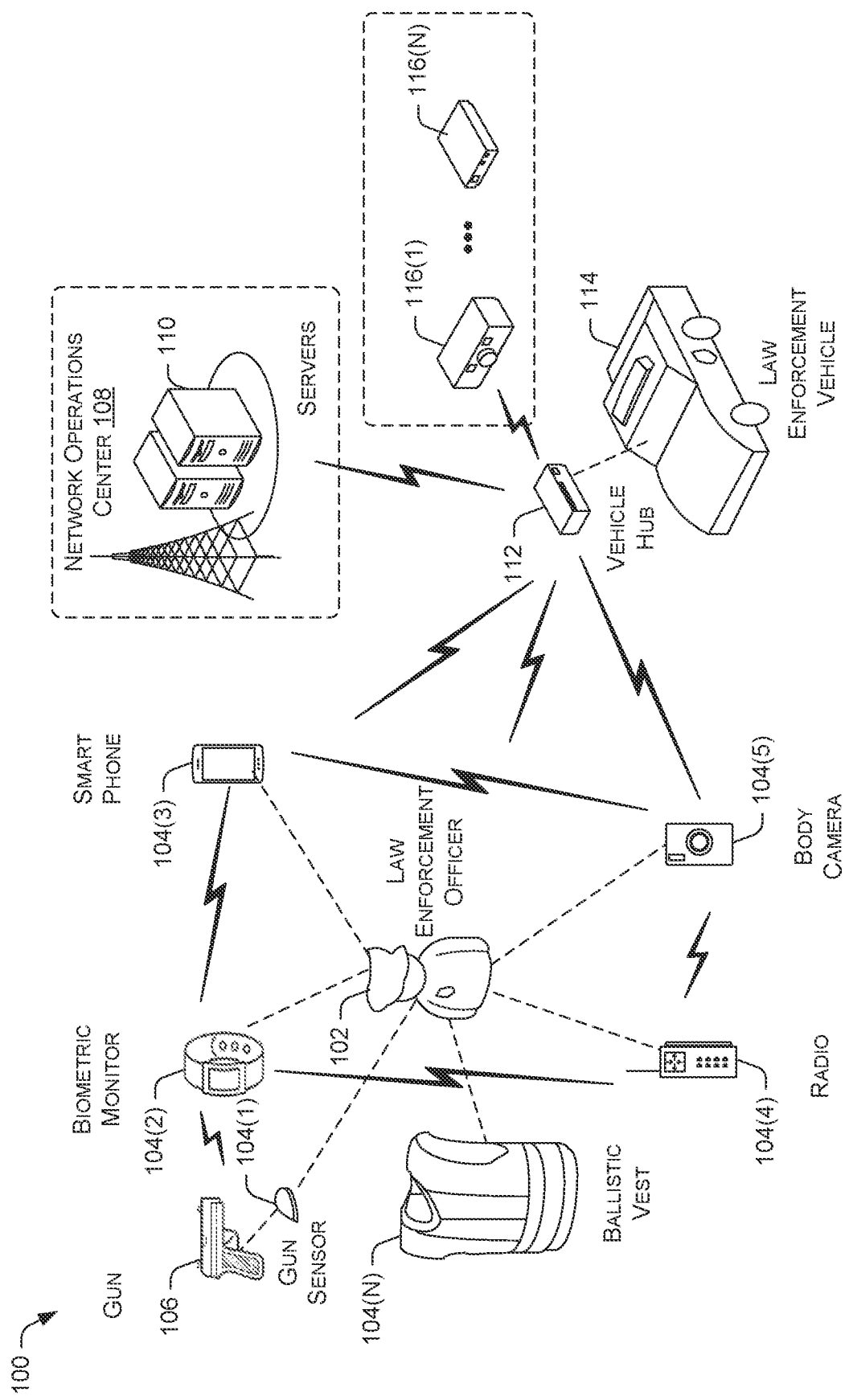
FIG. 1 illustrates an example environment for implementing operational state management of connected user devices based on heartbeat signal information.

Described herein are techniques for managing the operational states of multiple connected devices, such as various body-worn devices and in-vehicle devices used by a law enforcement officer, based on information that is exchanged by the multiple connected devices via heartbeat signals. The body-worn devices may include a body camera, a radio, a smartphone, a biometric monitor, a non-lethal electronic shock weapon, electronic add-on sensors for the officer's primary weapon, and/or so forth. In some instances, the body-worn device may be a standalone device that is worn on the body of the law enforcement officer. In other instances, the body-worn device may be integrated into another garment or another piece of equipment already worn by the law enforcement officer, such as a ballistic vest. The in-vehicle devices may include devices that are installed in or on a law enforcement vehicle, such as a laptop, a radio, a camera, a digital video recorder (DVR), and/or so forth.

In various embodiments, each of the multiple devices that are connected together, i.e., communicatively coupled together, may send heartbeat signals to every other connected device. Each of the heartbeat signals may include data such as device identification information, device type information, current battery level, current activity status, current network connectivity status, and/or so forth. Thus, a connected device of the multiple connected devices may determine based on the heartbeat signals whether a higher-level hub device with an active network connection to a backend service of a NOC is available, communicatively connected to the connected user device. Accordingly, if the higher-level hub device is available, the connected device may send any sensor data that the connected device detects to the higher-level hub device for analysis and/or further transmission to the backend service of the NOC. However, if the higher-level hub device is not available, the connected device may attempt to initiate an active network connection via a communication channel to the backend service of the NOC. Subsequently, if the connected device is able to successfully establish an active network connection to the backend service, the connected device may then act as a hub device for routing communications between one or more other devices that are connected to the connected device and the backend service. For example, the connected device may send out heartbeat signals that indicate that the connected device is functioning as a hub device, such that the other devices may use the connected device for communication to the backend service. In some instances, by acting as the hub device, the connected device may also analyze the data that are received from the one or more devices to determine whether at least one device is to be triggered to take one or more actions based on the data.

In some embodiments, each of the connected devices may be capable of switching between different operational states based on its battery level while sending out heartbeat signals to other connected devices. For example, a connected device may switch from an active state to a lower power energy saving state to conserve its battery when the battery level of the connected device drops below a predetermined battery level threshold. (e.g., 10% battery life remaining). However, such switching by the connected device may be overridden by a hub device or a backend service of NOC based on data provided by the connected device or another connected device. For example, a body camera may switch from an active multimedia streaming state to a low power sleep state when the battery level of the body camera is below a 10% battery level. However, when the hub device receives data that indicates a gun sensor has detected that a gun is unholstered, the hub device may switch the body camera back to the active multimedia streaming state despite the critically low battery level. In another example, an in-vehicle camera in a particular vehicle may switch from an active multimedia streaming state to a low-power sleep state when the battery level of the in-vehicle camera is below a 4% battery level and the particular vehicle's engine is powered off. However, when the backend service at the NOC receives information from the smartphone of another law enforcement officer that the other law enforcement officer is responding to an incident that is within a predetermined distance of the location of the particular vehicle, the backend service may send a command that directs the in-vehicle camera to switch back to the active multimedia streaming state.

By exchanging heartbeat signals that include device operational state information, the connected devices may notify other devices of their operational states, as well as provide operational state information to a hub device or a backend service at a NOC. In turn, the hub device or the backend service may use the operational state information of the connected devices and detected event occurrences to modify the operational states of the connected devices. Example implementations are provided below with reference to FIGS. 1-5.

Example Environment

FIG. 1 illustrates an example environment for implementing operational state management of connected user devices based on heartbeat signal information. The environment 100 may include a law enforcement officer 102 that is equipped with multiple body-worn devices 104(1)-104(N). The body-worn devices 104(1)-104(N) may include various devices that are carried by the law enforcement officer 102. For example, the body-worn device 104(1) may be a gun sensor that is attached to a gun 106 or a holster for the gun 106, such that the gun sensor may detect whether the gun 106 is holstered, unholstered, cocked, decocked, fired, misfired, dropped, and/or so forth. The body-worn device 104(2) may be a biometric monitor (e.g., a smartwatch) that monitors the vital signs of the law enforcement officer 102, such as body temperature, blood pressure, heart rate, etc. The body-worn device 104(3) may be a smartphone that is carried by the law enforcement officer 102. The body-worn device 104(4) may be a radio that the law enforcement officer 102 uses to communicate with a network operations center (NOC) 108. The body-worn device 104(5) may be a body camera that is capable of capturing audiovisual recordings, e.g., video, of scenes and events encountered by the law enforcement officer 102. The body-worn device 104(N) may be a ballistic vest that is equipped with impact sensors to detect the impact of bullets and/or blunt objects against the ballistic vest. Each of the body-worn devices 104(1)-104(N) may have short-range wireless communication capabilities, such as Bluetooth, UWB, Wi-Fi, etc. In some instances, a body-worn device may be capable of using the short-range wireless communication capabilities to communicate with another body-worn device.

Some of the body-worn devices 104(1)-104(N) may also have long-range wireless communication capabilities, such as cellular, satellite, etc. The cellular and satellite communication capabilities may be provided by respective cellular or satellite service providers. Accordingly, a body-worn device, such as a smartphone, may be capable of using the long-range wireless communication capabilities to communicate with the servers 110 of the NOC 108. The NOC 108 may include servers 110 that implement a computer-assisted dispatch platform, a data processing platform, and a data file storage platform. For example, the NOC 108 may be a part of a police station or an emergency assistance dispatch center. The servers 110 may be physical servers located at the NOC 108 or virtual servers that are implemented in a cloud. Accordingly, the one or more platforms of the NOC 108 may provide backend services that support law enforcement activities.

Additionally, at least some of the body-worn devices 104(1)-104(N) may be equipped with an electrically conductive coupling port that enables the device to be connected to and communicate with another device. The electrically conductive coupling ports may be a USB port, a parallel data port, or some other type of communication port. For example, the electrically conductive coupling port may be a mating receptacle that is configured to accept a mating plug of an electrically conductive wired connector, in which the wired connector includes a set of one or more electrically conductive wires or cables sufficient to complete an electrical circuit between two devices. However, in other implementations, the mating receptacle and plug may be substituted with other detachable connection mechanisms, such as a magnetic electrical connection mechanism. In some embodiments, the body-worn device may use the electrically conductive coupling port to send and receive communication that is encoded using digital and/or analog signals.

In various embodiments, the body-worn devices 104(1)-104(N) may use their short-range communication capabilities to exchange communications with a hub device. In some instances, the hub device may be a vehicle hub 112 that is installed in a law enforcement vehicle 114 of the law enforcement officer 102. The vehicle hub 112 may have similar short-range and long-range wireless communication capabilities. The vehicle hub 112 may be capable of using the short-range wireless communication capabilities to communicate with the body-worn devices 104(1)-104(N) or another hub device. Additionally, the vehicle hub 112 may use the long-range wireless communication capabilities to communicate with the servers 110 of the NOC 108.

Additionally, in some instances, the vehicle hub 112 may be equipped with electrically conductive coupling ports that enable the vehicle hub 112 to be connected to and communicate with one or more other devices that are similarly equipped with electrically conductive coupling ports. For example, such electrically conductive coupling ports may include USB ports, parallel data ports, or some other type of communication ports. Accordingly, the vehicle hub 112 may use short-range wireless communication or wired communication to communicate with in-vehicle devices 116(1)-116(N) that are installed in the law enforcement vehicle 114. For example, the in-vehicle devices 116(1)-116(N) may include a dashboard camera, a laptop computer, an in-vehicle radio, a vehicle interface module that is able to detect various vehicle statuses related to the law enforcement vehicle 114, and/or so forth. For example, the vehicle statuses may include whether the engine is on or off, whether doors of the vehicle are open or closed, whether emergency lights are on or off, whether the emergency siren is on or off, and/or so forth. In various embodiments, the vehicle hub 112 is not a dedicated hub device, but simply a device that has sufficient memory and processing power to execute a preconfigured hub software. For example, the vehicle hub 112 may be a digital video recorder (DVR) that is installed in the law enforcement vehicle 114 to store multimedia files that are captured by a dashboard camera, but which is configured with the hub software.

Thus, the body-worn devices 104(1)-104(N), the in-vehicle devices 116(1)-116(N), and the vehicle hub 112 may use wireless or wired communication to form a mesh network that enables each of the connected devices to communicate with any other device in the mesh network. Accordingly, the body-worn devices 104(1)-104(N) and the in-vehicle devices 116(1)-116(N) may use short-range wireless communications and/or wired communication to send event data to the vehicle hub 112. As examples, the events that are detected or recorded by the sensors of the body-worn devices 104(1)-104(N) may include the gun sensor 104(1) detecting that a gun 106 of the law enforcement officer of the law is unholstered or holstered, an accelerometer in the smartphone 104(3) detecting that the officer is running, walking, or remaining still for a predetermined period of time, the biometric monitor 104(2) detecting that the heart rate of the law enforcement officer 102 is exceeding or falling below a predetermined rate threshold, an impact sensor in the ballistic vest 104(N) detecting an impact, and/or so forth. Thus, the events that are detected may include discrete events, such as a gun being unholstered or holstered, or a series of continuous events, such as a series of heart rate readings or body temperature readings. Further, the event notification for an event may include one or more predetermined encoded values that correspond to the occurrence of the event. The event notification for an event may also be accompanied by sensor data that are captured by a sensor of a body-worn device for the event. For example, the sensor data may include audio data, video data, multimedia data, and/or so forth.

In some instances, the vehicle hub 112 may use its hub software to analyze the received event data and trigger one or more of the body-worn devices 104(1)-104(N) and/or the in-vehicle devices 116(1)-116(N) to perform one or more actions and/or change their operational states in response to events that are detected. In some embodiments, the vehicle hub 112 may include a software event handler that processes event data and generates commands for the connected body-worn devices. For example, the vehicle hub 112 may trigger a body camera of a law enforcement officer 102 to start a video recording when the vehicle hub 112 is notified by a gun sensor that the officer's gun is unholstered. In other embodiments, the vehicle hub 112 may alternatively or concurrently send and receive event data to a backend service of the NOC 108 for analysis by an event analysis service of the NOC 108. Since the backend service of the NOC 108 is capable of receiving event data from multiple body-worn and in-vehicle devices of multiple law enforcement officers, the event analysis service may trigger any device of any law enforcement officer to perform one or more actions and/or change their operational states based on the event data collected from a multitude of devices.

In some embodiments, the body-worn devices 104(1)-104(N), the in-vehicle devices 116(1)-116(N), and the vehicle hub 112, may send heartbeat signals to other connected devices that are in the same mesh network. Each of the heartbeat signals may encode information that includes device identification information, device type information, current battery level, current activity status, current network connectivity status, and/or so forth. Each connected device may send its heartbeat signals to the other connected devices in the mesh network on a periodic basis. Thus, a connected device of the multiple connected devices may determine based on the heartbeat signals whether a higher-level hub device with an active network connection to a backend service of the NOC 108 is available, i.e., communicatively connected to the connected device. For example, a higher-level hub device may become unavailable to the connected device when the hub device looses its active network connection due to weak or obstrcuted network connection signal, depletes its battery level to below a preconfigured threshold that forces it to shut down or enter into a sleep mode, suffers a device fault that interrupts its operation, and/or so forth.

A connected device may use a hub device hierarchy table stored in its memory to determine whether a higher-level hub device is available. The hub device hierarchy table of a connected device may contain a hierarchical list of higher-level hub devices that the connected device is to use to send sensor data to as long as the hub devices can be connected to by the connected device, and the higher-level hub devices have active network connections. The various hub devices may be listed in the hub device hierarchy table in the order of preference for providing a network connection to the backend service of the NOC. For example, the hub device hierarchy table for the body camera 104(N) may list the in-vehicle DVR, e.g., the vehicle hub 112, as the most preferred (highest level) hub device, the smartphone 104(3) as the second most preferred (second highest level) hub device, and/or so on and the so forth. In another example, the hub device hierarchy table for the smartphone 104(3) may list the in-vehicle DVR as the preferred (higher-level) hub device. The hub device hierarchy table for a connected device may also indicate whether the connected device can itself act as a hub device when no higher-level hub devices with active network connections are available. For example, the hub device hierarchy table for the body camera 104(N) may indicate that the body camera 104(N) is not to act as a hub device when no higher-level hub devices with active network connections are available. This is because the body camera 104(N) may lack the memory, processing, and/or network connectivity capabilities to act as a hub device, e.g., lack the ability to execute the hub software. In contrast, the hub device hierarchy table for the smartphone 104(3) may indicate that the smartphone 104(3) may act as a hub device when no higher-level hubs device with active network connections are available. This is because the smartphone 104(3) may have the necessary memory, processing, and/or network connectivity capabilities to act as a hub device by executing hub software.

Accordingly, if a higher-level hub device with an active network connection to the backend service of the NOC is available, i.e., communicatively connected to the connected device, the connected device may send any sensor data that the connected device detects to the higher-level hub device for analysis and/or further transmission to the backend service of the NOC. However, if the higher-level hub device is not available and the connected device is permitted to do so, the connected device may attempt to initiate an active network connection via a communication channel to the backend service of the NOC. For example, when the smartphone 104(3) determines from the heartbeat signals that it receives that the vehicle hub 112 no longer has an active network connection to the backend service, the smartphone 104(3) may attempt to initiate its own active network connection to the backend service.

Subsequently, if the connected device is able to successfully establish an active network connection to the backend service, the connected device may then act as a hub device for routing communications between one or more other devices that are connected to the connected device and the backend service. In such a case, the connected device may send out heartbeat signals that indicate that the connected device is functioning as a hub device, such that the other devices may use the connected device for communication to the backend service. For example, having established the active network connection to the backend service, the smartphone 104(3) may act as a hub device to route data from a connected body camera, a connected gun sensor, a connected biometric monitor, and/or so forth to the backend service. In some instances, by acting as the hub device, the connected device may also analyze the data that are received from the one or more devices to determine whether at least one device is to be triggered to take one or more actions based on the data. For example, by acting as the hub device, the smartphone 104(3) may trigger a body camera of the law enforcement officer 102 to start a video recording when the smartphone 104(3) is notified by a gun sensor that the officer's gun is unholstered.

In some embodiments, each of the connected devices may be capable of switching between different operational states based on its battery level while sending out heartbeat signals to other connected devices. For example, a connected device may switch from an active state to a lower power energy-saving state to conserve its battery when the battery level of the connected device drops below a predetermined battery level threshold. (e.g., 10% battery life remaining). In another example, a connected device may shut off its geolocation, e.g., GPS function to conserve battery when the battery level falls below a predetermined battery level threshold. In an additional example, a connected device may turn off its network connection for uploading data and instead temporarily stores data that the device collects in a memory of the device when the battery level of the device drops below a predetermined battery level threshold. However, the devices may revert back to their operational states when their battery levels are no longer below their respective predetermined battery level thresholds, such as when the batteries of these devices are subsequently charged.

Further, such switching of operational state by the connected device may be overridden by a hub device or a backend service of the NOC 108 based on data provided by the connected device or another connected device. For example, the body camera 104(N) of the law enforcement officer 102 may switch from an active multimedia streaming state to a low-power sleep state that stops the streaming when the battery level of the body camera 104(N) is below a 10% battery level. However, when the vehicle hub 112 receives data that indicates a gun sensor 104(1) of the law enforcement officer 102 has detected that a gun of the law enforcement officer 102 is unholstered, the vehicle hub 112 may switch the body camera 104(N) back to the active multimedia streaming state despite the critically low battery level. In another example, an in-vehicle dashboard camera in the law enforcement vehicle 114 of the law enforcement officer 102 may switch from an active multimedia streaming state to a low-power sleep state that stops the streaming when the battery level of the in-vehicle dashboard camera is below a 4% battery level and the vehicle's engine is powered off. However, when the backend receives information from the smartphone of another law enforcement officer that such a law enforcement officer is responding to an incident that is within a predetermined distance of the location of the law enforcement vehicle 114, the backend service may send a command that directs the in-vehicle dashboard camera to switch back to the active multimedia streaming state.

Example User Device Components

Figure 2:
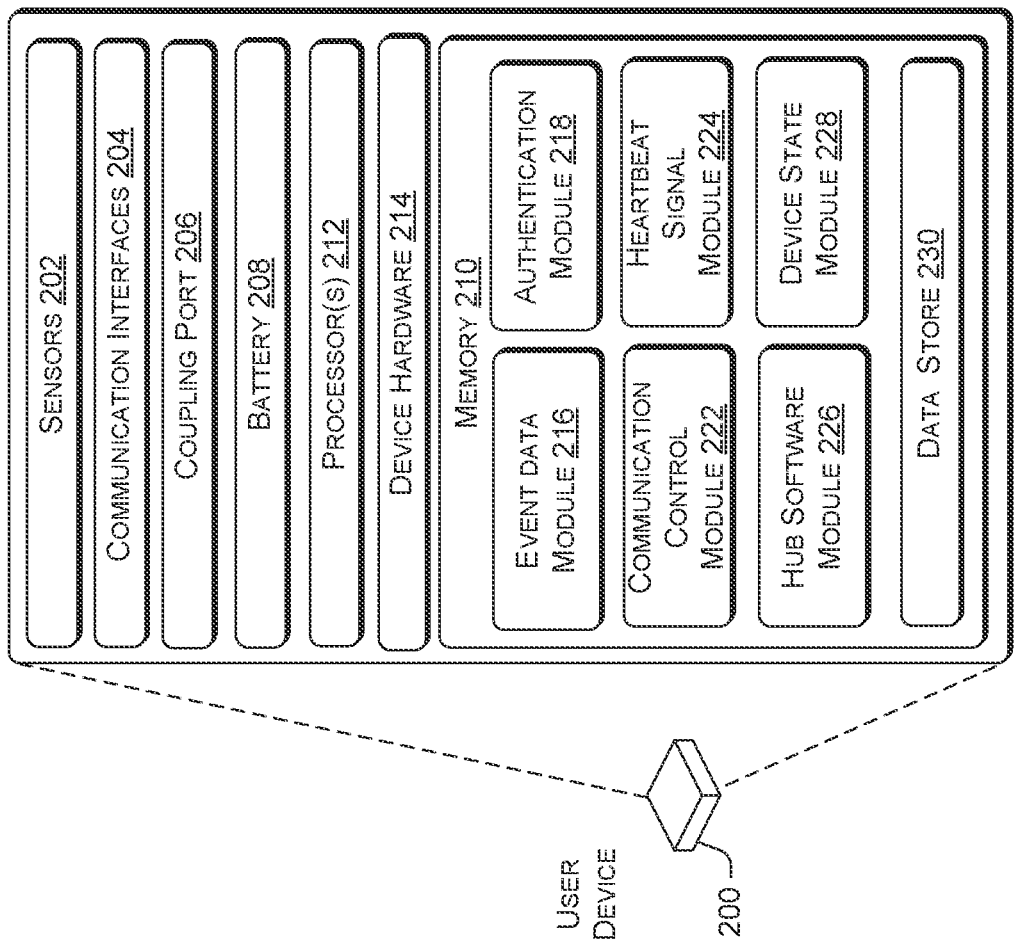
FIG. 2 is a block diagram showing various components of a user device that participates in the operational state management of user devices based on heartbeat signal information.

FIG. 2 is a block diagram showing various components of a user device that participates in the operational state management of user devices based on heartbeat signal information. The user device 200 may be equipped with one or more sensors 202, communication interfaces 204, an electrically conductive coupling port 206, a battery 208, memory 210, one or more processors 212, and device hardware 214. The sensors 202 may include a compass, an accelerometer, one or more pressure sensors, a global positioning system (GPS) sensor, an audio sensor, a video sensor, and/or so forth. The communication interfaces 204 may include short-range wireless transceivers (e.g., Bluetooth, UWB, Wi-Fi, and/or so forth) and long-range wireless transceivers (e.g., cellular, satellite, and/or so forth) that enable the user device 200 to wirelessly communicate with other devices. The electrically conductive coupling port 206 may be configured to accept an electrically conductive wired connector. The wired connector may be used by the user device 200 to receive power input to the user device 200 from an external source, output power from the user device 200 to an external load, as well as perform wired communication.

The memory 210 may be implemented using computer-readable media, such as computer storage media. Computer-readable media includes, at least, two types of computer-readable media, namely computer storage media and communications media. Computer storage media includes volatile and non-volatile, removable, and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 214 may include user interface hardware, such as physical buttons, a gesture recognition mechanism, or a voice activation mechanism. The device hardware 214 may further include signal converters, antennas, modems, hardware decoders and encoders, graphic processors, digital signal processors, microprocessors, power routing circuitry, a real-time clock (RTC) circuit, and/or so forth. The device hardware 214 may enable the user device 200 to exchange wired or wireless communication with other devices via the communication interfaces 204, as well as receive power or output power via the electrically conductive coupling port 206 based on software instructions.

The processors 212 and the memory 210 of the user device 200 may implement an event data module 216, an authentication module 218, a communication control module 222, a heartbeat signal module 224, a hub software module 226, and a device state module 228. These modules may include routines, program instructions, objects, and/or data structures that perform particular tasks or implement particular abstract data types. The memory 210 may further store software (e.g., drivers, applications, firmware, etc.) that support various functionalities of the user device 200, such as software that are executed by the processors 212 to support the establishment of wired and wireless communication links. The memory 210 may also provide a data store 230 that is capable of storing event data. The event data may include sensor data captured by the sensors 202, associated metadata for the sensor data, and/or so forth. In some embodiments, an operating system may also be implemented via the one or more processors 212 and the memory 210 to perform various functions, as well as provide an execution environment that supports the executions of applications and modules.

The event data module 216 may send event data that includes event notifications of detected events and/or sensor data associated with the events to a hub device. The event data module 216 may send the event data to the hub device via available wired communication or alternatively via short-range wireless communication. In turn, the event data module 216 may receive commands for the user device 200 to perform specific actions. For example, such actions may include activating or deactivating one or more specific sensors, built-in functions, software applications, hardware components, and/or so forth of the user device 200.

The authentication module 218 may handle the authentication of the user device 200 with other user devices and hub devices so that the user device 200 may exchange wireless communication with such devices. In order to establish a wireless communication link with a device, the authentication module 218 may use a device authentication credential (e.g., a device identifier, a secret code, a key, a digital certificate, and/or so forth) to authenticate the user device 200 to the device.

The communication control module 222 may switch the user device 200 between using the short-range wireless transceiver and the electrically conductive coupling port 206 to exchange communications with the other devices. The communication control module 222 may use the authentication module 218 to perform authentication in order to establish a short-range wireless communication link with another device. In some embodiments, the communication control module 222 may automatically terminate a short-range wireless communication link that is established with a device when a wired connection is established with the same device via the electrically conductive coupling port 206. For example, the communication control module 222 may detect that the user device 200 is connected to another device via a wired connector by a detected change in one or more electrical properties (e.g., voltage, resistance, and/or current) at the electrically conductive coupling port 206. As a result, the communication control module 222 may terminate the short-range wireless communication link by powering off the short-range wireless transceiver.

In other embodiments, the communication control module 222 may further use a wired communication protocol (e.g., Universal Serial Bus (USB) protocol, TCP/IP, or some other wired communication protocol) to establish a wired communication link with a device over the wired connection. In some instances, the communication control module 222 may wait for a device to initiate the establishment of the wired communication link using the wired communication protocol. However, in other instances, the communication control module 222 may initiate the establishment of the wired communication link with the device using the wired communication protocol. Once the wired communication link is established, the communication control module 222 may terminate the short-range wireless communication link by powering off the short-range wireless transceiver.

Conversely, when the communication control module 222 detects that the wired connection between the user device 200 and another device is terminated, the communication control module 222 may power on the short-range wireless transceiver. For example, the one or more electrical properties at the electrically conductive coupling port 206 may indicate to the communication control module 222 that the wired connection is severed. The powering on of the short-range wireless transceiver may enable the user device 200 to reestablish a short-range wireless communication link with the device.

The heartbeat signal module 224 may send heartbeat signals to one or more devices that are connected to the user device 220 via wired or wireless connections. Each of the heartbeat signals may include data such as device identification information, device type information, current battery level, current activity status, current network connectivity status, and/or so forth. The current activity status may indicate whether the device is in active mode, an energy-saving sleep mode, hub device mode, and/or some other mode. The current network connectivity status may indicate the network connections that the device has to other devices and networks, the type of network connectivity for each network connection (e.g., wireless, wired, etc.), and the connectivity status for each network connection (e.g., active, terminated, attempting to establish or re-established, and/or so forth). The heartbeat signal module 224 may send the heartbeat signals to the one or more connected devices on a periodic basis. Alternatively, or concurrently, the heartbeat signal module 224 may also send heartbeat signals in response to requests from other connected devices.

The hub software module 226 may receive the heartbeat signals from other connected user devices. Accordingly, the hub software module 226 may determine based on the heartbeat signals whether a higher-level hub device with an active network connection to a backend service of the NOC 108 is available based on a hub device hierarchy table stored in the data store 230. The hub device hierarchy may also indicate whether the user device 200 can itself act as a hub device when no higher-level hub devices with active network connections are available. Accordingly, if the higher-level hub device is available, i.e., communicatively connected to the user device 200, the hub software module 226 may send any sensor data that the connected device detects to the higher-level hub device for analysis and/or further transmission to the backend service of the NOC. However, if the higher-level hub device is not available and the user device 200 is permitted to do so, the hub software module 226 may attempt to initiate an active network connection via a communication channel to the backend service of the NOC. Subsequently, if the hub software module 226 is able to successfully establish an active network connection to the backend service, the user device 200 may then act as a hub device for routing communications between one or more other devices that are connected to the connected device and the backend service. In such a case, the hub software module 226 may direct the heartbeat signal module 224 to send out heartbeat signals that indicate that the user device 200 is functioning as a hub device, such that the other devices may use the connected device for communication to the backend service. In some instances, the hub device may send the heartbeat signals of the connected device to the backend service such that the information in the heartbeat signals may be analyzed by the backend service for triggering actions.

The indication that the user device 200 is functioning as a hub device may prompt other user devices connected to the user device 200 to send their sensor data to the user device 200. Furthermore, when the hub software module 226 detects heartbeat signals that indicate a higher-level hub device with an active network connection to the backend service has reappeared, the hub software module 226 may terminate its network connection with the backend service.

Subsequently, the hub software module 226 may terminate the sending of heartbeat signals indicating that the user device 200 is functioning as a hub device. Likewise, if the hub software module 226 determines that the user device 200 has lost its active connection to the backend service, the hub software module 226 may revert the user device 200 to being a non-hub device and terminate the sending of heartbeat signals indicating that the user device 200 is functioning as a hub device.

The hub software module 226 may also include data analysis algorithms that analyze the data received from other user devices. The data analysis algorithms may be active when the user device 200 is playing the role of a hub device. Accordingly, the hub software module 226 may trigger a user device to perform an action based on event data received from the connected device or one or more other connected user devices. For example, such actions may include activating or deactivating one or more specific sensors, built-in functions, software applications, hardware components, and/or so forth of a user device.

The device state module 228 may switch the user device 200 between various operational states based on a battery level of the user device 200. For example, the device state module 228 may switch the user device 200 from an active state to a lower power energy saving state to conserve its battery when the battery level of the user device 200 drops below a predetermined battery level threshold. (e.g., 10% battery life remaining). However, such switching by the device state module 228 may be overridden by a hub device or a backend service of NOC based on data provided by the connected device or another connected device. For example, the device state module 228 may receive commands that direct the device state module 228 to switch the user device 200 to different device operational states.

Example Backend Service Components

Figure 3:
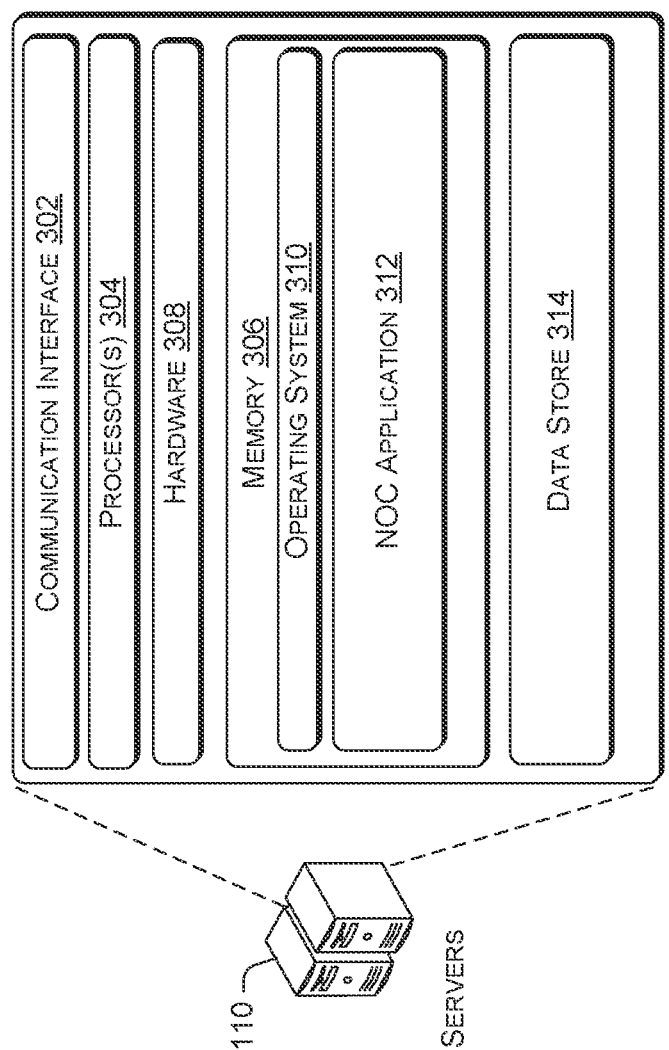
FIG. 3 is a block diagram showing various components of a computing device in a network operation center (NOC) that communicates with multiple connected devices to manage the operational state of the user devices.

FIG. 3 is a block diagram showing various components of a computing device in a network operation center (NOC) that communicates with multiple connected devices to manage the operational state of the user devices. The servers 110 may provide a communication interface 302, one or more processors 304, memory 306, and hardware 308. The communication interface 302 may include wireless and/or wired communication components that enable the devices to transmit data to and receive data from other networked devices. The hardware 308 may include additional hardware interface, data communication, or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multi-media/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processors 304 and the memory 306 of the servers 110 may implement an operating system 310. In turn, the operating system 310 may provide an execution environment for a NOC application 312 that provides backend services. The operating system 310 may include components that enable the servers 110 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The NOC application 312 may include routines, program instructions, objects, and/or data structures that perform particular tasks or implement particular abstract data types. The memory 306 may also include a data store 314 that is used by the NOC application 312.

The NOC application 312 on the servers 110 may receive sensor data collected by sensors of user devices and determine whether to trigger user devices to perform actions based on the sensor data. In various embodiments, the NOC application 312 may use a trained ML model to process the received sensor data to determine whether an event that warrants the trigger of user device actions occurred. The ML model may be trained via a model training algorithm. The model training algorithm may implement a training data input phase, a feature engineering phase, and a model generation phase. In the training data input phase, the model training algorithm may receive training datasets. For example, the NOC application 312 may use training datasets that include a combination of sensor data that includes protective equipment sensor data, incident report data, police dispatch, injury reports, and/or so forth. During the feature engineering phase, the model training algorithm may pinpoint features in the training data. Accordingly, feature engineering may be used by the model training algorithm to figure out the significant properties and relationships of the input datasets that aid a machine learning model to distinguish between different classes of data. During the model generation phase, the model training algorithm may select an initial type of machine learning algorithm to train a machine learning model using the training data. Following the application of a selected machine learning algorithm to the training data, the model training algorithm may determine a training error measurement of the machine learning model. If the training error measurement exceeds a training error threshold, the model training algorithm may use a rule engine to select a different type of machine learning algorithm based on a magnitude of the training error measurement. The different types of machine learning algorithms may include a Bayesian algorithm, a decision tree algorithm, a support vector machine (SVM) algorithm, an ensemble of trees algorithm (e.g., random forests and gradient-boosted trees), an artificial neural network, and/or so forth. The training process is generally repeated until the training results fall below the training error threshold, and the trained machine learning model is generated.

Alternatively, or concurrently, the NOC application 312 may analyze the sensor data in conjunction with additional data to determine whether user device actions are to be triggered for events that occurred. The NOC application 312 may use the additional data in the analysis based on a configuration setting inputted by an administrator at the NOC 108. For example, the additional data may comprise information included in the heartbeat signals of various devices, incident reports of incidents that occurred within a predetermined time interval of a current time that the emergency situation occurred in a predetermined area that includes a geolocation of the law enforcement officer, such as an armed suspect on the loose, a riot in progress, a traffic accident occurred, a wildfire is burning in the area, etc.

Accordingly, the NOC application 312 may initiate one or more actions in response to a set of event data or a determination that a specific event occurred. For example, the actions may include triggering the body camera of the law enforcement officer to start a video recording, triggering a smartphone carried by the law enforcement officer to start recording a video when the battery level of the body camera carried by the law enforcement officer drops below a predetermined threshold, sending automatic requests for emergency situation assistance to nearby body-worn hubs or ground vehicles of other law enforcement officers that are within a predetermined distance of the geolocation of the law enforcement officer. Other actions may include triggering the body camera of the law enforcement officer to start a video recording, sending automatic requests for emergency situation assistance to nearby body-worn hubs or ground vehicles of other law enforcement officers that are within a predetermined distance of the geolocation of the law enforcement officer, and/or so forth. Additional actions may include sending commands to user devices of a law enforcement officer that causes the user devices to change their operational states. For example, an in-vehicle camera in a vehicle of a law enforcement officer may switch from an active multimedia streaming state to a low-power sleep state when the battery level of the in-vehicle camera is below a 4% battery level and the particular vehicle's engine is powered off. However, when the NOC application 312 receives information from the smartphone of another law enforcement officer that the other law enforcement officer is responding to an incident that is within a predetermined distance of the location of the particular vehicle, the backend service may send a command that directs the in-vehicle camera to switch back to the active multimedia streaming state.

Example Processes

Figure 4:
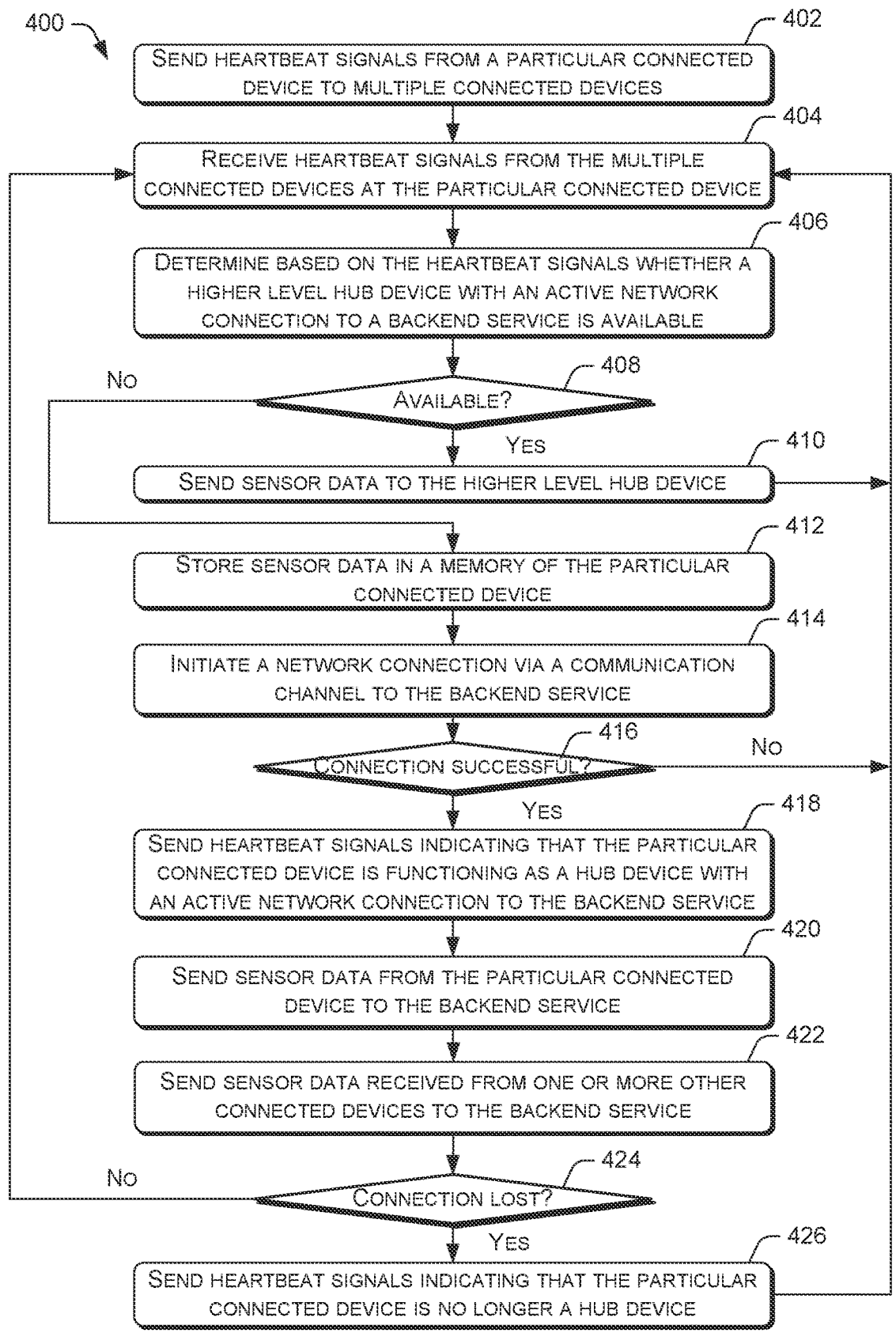
FIG. 4 is a flow diagram of an example process for a connected user device to assume a role of a hub device to route data between multiple connected devices and a backend service of a NOC.
Figure 5:
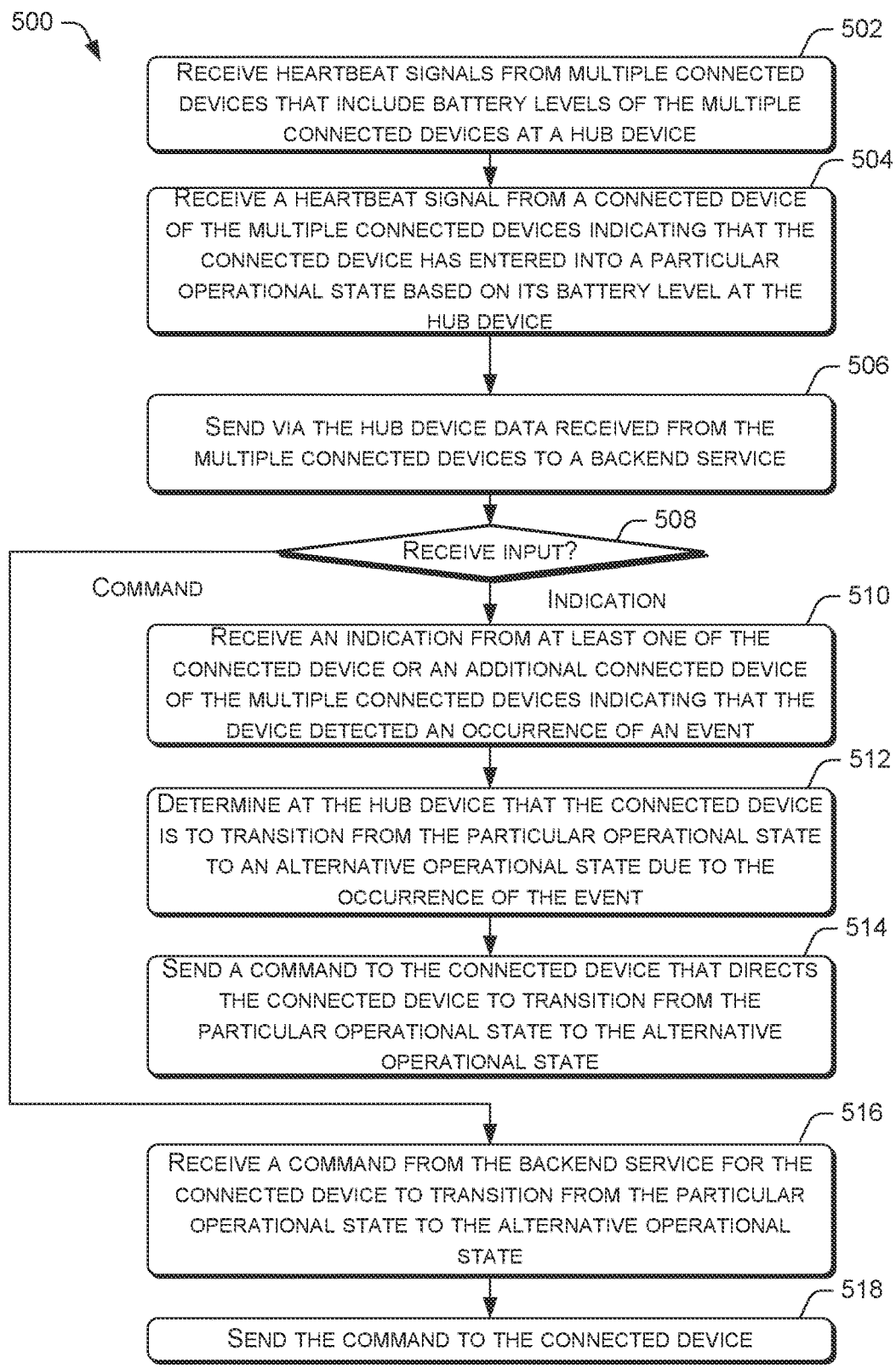
FIG. 5 is a flow diagram of an example process for using heartbeat signal information exchanged by multiple connected devices to alter the operational states of the connected user devices.

FIGS. 4 and 5 present illustrative processes 400 and 500 for implementing operational state management of connected user devices based on heartbeat signal information. Each of the processes 400 and 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400 and 500 are described with reference to the environment 100 of FIG. 1.

FIG. 4 is a flow diagram of an example process 400 for a connected user device to assume a role of a hub device to route data between multiple connected devices and a backend service of a NOC. At block 402, a particular connected device may send heartbeat signals to multiple connected devices. Each of the heartbeat signals may include data such as device identification information, device type information, current battery level, current activity status, current network connectivity status, and/or so forth. At block 404, the particular connected device may receive heartbeat signals from the multiple connected devices. At block 406, the particular connected device may determine based on the heartbeat signals whether a higher-level hub device with an active network connection to a backend service is available, i.e., communicatively connected to the particular connected device. In various embodiments, the backend service may be provided by one or more servers 110 of the NOC 108.

At decision block 408, if the particular connected device determines that the higher-level device with the active network connection is available ("yes" at decision block 408), the process 400 may proceed to block 410. At block 410, the particular connected device may send sensor data to the higher-level hub device. In various embodiments, the sensor data may include event data, audio data, video data, multimedia data, and/or so forth. Subsequently, the process 400 may loop back to block 404. However, if the particular connected device determines that the higher-level device with the active network connection is not available ("no" at decision block 408), the process 400 may proceed to block 412. At block 412, the particular connected device may store sensor data in a memory of the particular connected device.

At block 414, the particular connected device may initiate a network connection via a communication channel to the backend service. In various embodiments, the communication channel may be a Wi-Fi communication channel, a cellular communication channel, a satellite communication channel, and/or so forth. For example, the connected device may use its built-in Wi-Fi communication components to connect to an available Wi-Fi access point, and then use the Internet access provided by the access point to communicate with the backend service.

At decision block 416, if the particular connected device determines that the connection is successfully established, i.e., active ("yes" at decision block 416), the process 400 may proceed to block 418. At block 418, the particular connected device may send heartbeat signals indicating that the particular connected device is functioning as a hub device with an active network connection to the backend service to the multiple connected devices.

At block 420, the particular connected device may send sensor data from the particular connected device to the backend service. At block 422, the particular connected device may send sensor data received from one or more connected devices to the backend service. For example, the one or more connected devices may be prompted by the heartbeat signals from the particular connected device to treat the particular connected device as a hub device, and send their sensor data to the hub device for transmission to the backend service and/or analysis by the hub device.

At decision block 424, the particular connected device may determine whether the network connection between the particular connected device and the backend service is lost.

Thus, if the active network connection is not lost ("no" at decision block 424), the process 400 may loop back to block 404. Upon return the block 404, if the particular connected device subsequently determines that the higher-level hub device with an active network connection to the backend service is now available, i.e., the network connection of the higher-level hub device that is communicatively connected to the particular connected device is restored, the particular connected device may terminate its own active network connection to the backend service. The particular network service may further send heartbeat signals indicating that the particular network device is no longer a hub device.

However, if the active network connection is lost ("yes" at decision block 424), the process 400 may proceed to block 426. At block 426, the particular connected device may send heartbeat signals indicating that the particular network device is no longer functioning as a hub device. Returning to decision block 416, if the particular connected device determines that the connection is not successfully established ("no" at decision block 416), the process 400 may also loop back to block 404.

FIG. 5 is a flow diagram of an example process 500 for using heartbeat signal information exchanged by multiple connected devices to alter the operational states of the connected user devices. At block 502, a hub device may receive heartbeat signals from multiple connected devices that include battery levels of the multiple connected devices. At block 504, the hub device may receive a heartbeat signal from a connected device of the multiple connected devices indicating that the connected device has entered into a particular operational state based on its battery level. For example, the particular operational state may be an energy-saving mode, turning off an active network connection, turning off a geolocation function, and/or so forth.

At block 506, the hub device may send data received from the multiple connected devices to a backend service. In various embodiments, the data received from the multiple connected devices may include sensor data, data from the heartbeat signals, and/or so forth.

At decision block 508, if an indication of an occurrence of an event is received at the hub device, the process 500 may proceed to block 510. At block 510, the hub device may receive an indication from at least one of the connected device or an additional connected device of the multiple connected devices indicating that the device detected an occurrence of an event. The indication may be in the form of a set of sensor data from one or more devices that correspond to the occurrence of an event. At block 512, the hub device may determine that the connected device is to transition from the particular operational state to an alternative operational state due to the occurrence of the event. At block 514, the hub device may send a command to the connected device that directs the connected device to transition from the particular operational state to the alternative operational state. The alternative operational state may be an active mode instead of an energy-saving mode, turning on an active network connection, turning on a geolocation function, and/or so forth. In turn, the connected device may enter the alternative operational state in response to the command.

Returning to decision block 508, if a command is received at the hub device, the process 500 may proceed to block 516. At block 516, the hub device may receive a command from the backend service for the connected device to transition from the particular operational state to the alternative operational state. In various embodiments, the backend service may send the command to the hub device after analyzing event data received from at least one or more devices to determine that the connected device is to be in the alternative operational state. At block 518, the hub device may send the command from the backend service to the connected device. In turn, the connected device may enter the alternative operational state in response to the command.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a particular user device storing computer-executable instructions that upon execution cause one or more processors to perform acts comprising:
receiving heartbeat signals from multiple connected devices at the particular user device, wherein a connected device of the multiple connected devices is configured to be connected to one or more of a plurality of hub devices;
accessing a hierarchy of the plurality of hub devices stored in a memory of the particular user device, the hierarchy listing the plurality of hub devices in an order of preference for providing a network connection to a backend service;
determining, based at least on the heartbeat signals and on the hierarchy of the plurality of hub devices, whether at least one of the multiple connected devices is a higher-level hub device with an active network connection to the backend service and is connected to the particular user device; and
in response to determining that none of the multiple connected devices are a higher-level hub device with an active network connection to the backend service and are connected to the particular user device, establishing a network connection via a communication channel between the particular user device and the backend service,
wherein the particular user device, via the established network connection, is configured to:
provide communication between at least one of the multiple connected devices to the backend service; and
analyze data received from at least one of the multiple connected devices to determine whether at least one of the multiple connected devices is to be triggered to perform one or more actions.

2. The one or more non-transitory computer-readable media of claim 1, wherein the acts further comprise:
sending sensor data, in response to determining that at least one of the multiple connected devices is the higher-level hub device with an active network connection to the backend service and is connected to the particular user device, from the particular user device to the at least one of the multiple connected devices that is the higher-level hub device.

3. The one or more non-transitory computer-readable media of claim 1, wherein the acts further comprise sending heartbeat signals to the multiple connected devices indicating that the particular user device is functioning as a hub device with an additional active connection to the backend service.

4. The one or more non-transitory computer-readable media of claim 3, wherein the acts further comprise sending sensor data received from one or more other connected devices to the backend service following the sending of the heartbeat signals to the multiple connected devices indicating that the particular user device is functioning as the hub device.

5. The one or more non-transitory computer-readable media of claim 3, where the acts further comprise:
   determining that the network connection between the particular user device and the backend service is lost; and
   sending additional heartbeat signals in response to determining that the network connection between the particular user device and the backend service is lost, indicating that the particular user device is no longer functioning as the hub device.

6. The one or more non-transitory computer-readable media of claim 3, wherein the acts further comprise:
   determining that the active network connection between the at least one of the multiple connected devices that is the higher-level hub device and the backend service is restored; and
   in response to determining that the active network connection between the at least one of the multiple connected devices that is the higher-level hub device and the backend service is restored:
      terminating the network connection of the particular user device with the backend service, and
      sending additional heartbeat signals indicating that the particular user device is no longer functioning as the hub device.

7. The one or more non-transitory computer-readable media of claim 3, wherein the at least one of the multiple connected devices that is the higher-level hub device or the hub device is configured to trigger one or more connected devices to perform one or more actions based at least on sensor data received from at least one of the multiple connected devices.

8. The one or more non-transitory computer-readable media of claim 3, wherein the at least one of the multiple connected devices that is the higher-level hub device or the hub device is configured to send data received from the multiple connected devices to the backend service, the data including at least one of sensor data or information included in the heartbeat signals received from the multiple connected devices.

9. The one or more non-transitory computer-readable media of claim 3, wherein the backend service is configured to trigger one or more connected devices to perform one or more actions based at least on sensor data received from at least one of the multiple connected devices.

10. The one or more non-transitory computer-readable media of claim 1, wherein the particular user device and the multiple connected devices are connected to each other via one or more short-range wireless communication connections or one or more wired communication connections.

11. The one or more non-transitory computer-readable media of claim 1, wherein the communication channel is a long-range communication channel that includes a Wi-Fi communication connection, a cellular communication connection, or a satellite communication connection.

12. The one or more non-transitory computer-readable media of claim 1, wherein each of the heartbeat signals sent by a connected device encodes information that includes at least one of device identification information, device type information, current battery level, current activity status, or current network connectivity status for the connected device.

13. The one or more non-transitory computer-readable media of claim 1, wherein the higher-level hub device is a hub device that is listed in a hub device hierarchy table stored in a memory of the particular user device as preferred for providing a network connection to the backend service to the particular user device.

14. The one or more non-transitory computer-readable media of claim 1, wherein the heartbeat signals include a heartbeat signal from a connected device indicating that the connected device has entered into a particular operational state based on a battery level of the connected device.

15. The one or more non-transitory computer-readable media of claim 14, wherein the acts further comprise:
   receiving an indication from at least one connected device of the multiple connected devices indicating that the at least one connected device detected an occurrence of an event;
   determining that the connected device is to transition from the particular operational state to an alternative operational state due to the occurrence of the event; and
   sending a command to the connected device that directs the connected device to transition from particular operational state to the alternative operational state.

16. The one or more non-transitory computer-readable media of claim 14, wherein the acts further comprise:
   receiving a command from the backend service for the connected device to transitional from the particular operational state to an alternative operational state; and
   sending the command to the connected device that directs the connected device to transition from particular operational state to the alternative operational state.

17. A user device, comprising:
   one or more processors; and
   memory including a plurality of computer-executable components that are executable by the one or more processors to perform a plurality of actions, the plurality of actions comprising:
      receiving heartbeat signals from multiple connected devices at the user device, wherein a connected device of the multiple connected devices is configured to be connected to one or more of a plurality of hub devices;
      accessing a hierarchy of the plurality of hub devices stored in a memory of the user device, the hierarchy indicating if the user device is capable of acting as a hub device;
      determining, based at least on the heartbeat signals and on the hierarchy of the plurality of hub devices, whether at least one of the multiple connected devices is a higher-level hub device with an active network connection to a backend service and is connected to the user device;
      in response to determining that none of the multiple connected devices are a higher-level hub device with an active network connection to the backend service and are connected to the user device, establishing a network connection via a communication channel between the user device and the backend service;
      providing, by the established network connection, communication between at least one of the multiple connected devices to the backend service;
      analyzing data received from at least one of the multiple connected devices to determine whether at least one of the multiple connected devices is to be triggered to perform one or more actions; and in response to determining that at least one of the multiple connected devices is the higher-level hub device with an active network connection to the backend service and is connected to the user device, sending sensor data from the user device to the at least one of the multiple connected devices that is the higher-level hub device.

18. The user device of claim 17, wherein the heartbeat signals include a heartbeat signal from a connected device indicating that the connected device has entered into a particular operational state based on a battery level of the connected device.

19. The user device of claim 18, wherein the actions further comprise: receiving an indication from at least one connected device of the multiple connected devices indicating that the at least one connected device detected an occurrence of an event;

determining that the connected device is to transition from the particular operational state to an alternative operational state due to the occurrence of the event; and sending a command to the connected device that directs the connected device to transition from particular operational state to the alternative operational state.

20. A computer-implemented method, comprising:

receiving heartbeat signals from multiple body-worn connected devices at a particular user device, wherein a connected device of the multiple connected devices is configured to be connected to one or more of a plurality of hub devices, and wherein the connected devices are selected from a group consisting of at least two of: a portable recording device, a body camera, a radio, a mobile communication device, a biometric monitor, an electronic shock weapon, or a sensor for a weapon;

determining, based at least on the heartbeat signals and on a hierarchy of the plurality of hub devices, whether at least one of the multiple connected devices is a higher-level hub device with an active network connection to a backend service and is connected to the particular user device;

in response to determining that none of the multiple connected devices are a higher-level hub device with an active network connection to the backend service and are connected to the particular user device, establishing a network connection via a communication channel between the particular user device and the backend service;

providing, by the established network connection, communication between at least one of the multiple connected devices to the backend service;

analyzing data received from at least one of the multiple connected devices to determine whether at least one of the multiple connected devices is to be triggered to perform one or more actions; and in response to determining that at least one of the multiple connected devices is the higher-level hub device with an active network connection to the backend service and is connected to the particular user device, sending sensor data from the particular user device to the at least one of the multiple connected devices that is the higher-level hub device.

* * * * *